United States Patent [19]

Yamaya et al.

[11] Patent Number: 5,021,266

[45] Date of Patent: Jun. 4, 1991

[54] PRIMER COMPOSITION

[75] Inventors: Masaaki Yamaya, Annaka; Kazuharu Sato, Myogi; Masayuki Takahashi, Annaka, all of Japan

[73] Assignee: Shin-Etsu Chemical Co., Ltd., Tokyo, Japan

[21] Appl. No.: 537,414

[22] Filed: Jun. 13, 1990

Related U.S. Application Data

[62] Division of Ser. No. 278,593, Dec. 1, 1988, Pat. No. 4,960,809.

[30] Foreign Application Priority Data

Dec. 4, 1987 [JP] Japan ............................... 62-308373

[51] Int. Cl.$^5$ .............................................. B05D 3/02
[52] U.S. Cl. ..................................... 427/379; 427/387; 427/393.5; 427/412.1
[58] Field of Search ................... 427/387, 393.5, 412.1, 427/379

[56] References Cited

U.S. PATENT DOCUMENTS 4,783,347 11/1988 Doin et al. ........................ 427/387 X
4,808,487 2/1989 Nakasuji et al. ................. 427/387 X

*Primary Examiner*—Michael Lusignan
*Attorney, Agent, or Firm*—Wyatt, Gerber, Burke & Badie

[57] ABSTRACT

The primer composition of the invention is particularly useful as an undercoating composition for a protective overcoating formed with a silicone-based coating composition containing a colloidal silica powder in respect of the excellent adhesion, heat resistance, resistance against hot water and weatherability of the overcoating layer. The primer composition essentially comprises two components including (a) 100 parts by weight of a copolymer of a monomer mixture composed of (a-1) from 2 to 50% by weight of an ethylenically unsaturated monomeric compound having, in a molecule, an alkoxysilyl group and (a-2) from 98 to 50% by weight of an ethylenically unsaturated monomeric compound free from alkoxysilyl groups and copolymerizable with the monomeric compound (a-1); and (b) from 5 to 300 parts by weight of an amidated product obtained by the reaction of a halide, anhydride or isopropenyl ester of a carboxylic acid and a product obtained by the reaction of an amino group-containing alkoxysilane compound, an epoxy group-containing alkoxysilane compound and a silylating agent.

4 Claims, No Drawings

PRIMER COMPOSITION

This is a division of application Ser. No. 278,593 filed on Dec. 1, 1988, now U.S. Pat. No. 4,960,809.

BACKGROUND OF THE INVENTION

The present invention relates to a novel primer composition or, more particularly, to a primer composition suitable for priming the surface of an article of a plastic resin such as a polycarbonate resin as a pretreatment of coating with a silicone-based coating composition to form a wear-resistant coating film on the surface. The invention also relates to a method for providing a protective hard coating layer on a plastic-made article by using the above mentioned novel primer composition as well as a thus coated plastic-made article.

As is well known, polycarbonate resins as a class of thermoplastic synthetic resins have excellent transparency and high impact strength along with the advantageously low density so that they are widely used as a structural material in place of inorganic glassy materials. Polycarbonate resins, however, have several disadvantageous properties such as the relatively low wear resistance, susceptibility to the attack of various organic solvents and discoloration or degradation sometimes taking place in the lapse of time.

It is proposed accordingly to provide the surface of a shaped article of a polycarbonate resin with a protective coating film of a thermosetting resin. Among the thermosetting resins hitherto proposed for the purpose, organopolysiloxanes are highlighted in respect of the high wear resistance and solvent resistance. On the contrary to these advantages, silicone-based coating films have defects in respect of the relatively low durability of the coating films due to the poor adhesion to the surface of a thermoplastic resin such as polycarbonate resins and low weatherability or resistance against weathering in the lapse of time. Attempts have been made to solve these problems by using an organopolysiloxane-based coating composition in combination with a primer or undercoating composition comprising another synthetic polymer including (1) a thermoplastic acrylic resin disclosed in Japanese Patent Kokai 52-138565, (2) an acrylic resin having functional groups such as amino groups disclosed in Japanese Patent Kokai 53-138476, (3) a modified organopolysiloxane which is a reaction product of an alkoxy silane having a functional group such as amino and hydroxy and a cyclic acid anhydride compound disclosed in Japanese Patent Kokai 53-81533, (4) a combination of an amino silane and a hydrolysis product of an epoxy silane disclosed in Japanese Patent Kokai 54-63176, (5) a combination of a thermoplastic acrylic resin having functional groups and an ultraviolet absorber disclosed in Japanese Patent Kohyou 55-500809, (6) a combination of a thermosetting acrylic resin in the form of an aqueous emulsion and an ultraviolet-absorbing compound disclosed in Japanese Patent Kokai 55-160033, (7) a modified silicone which is a reaction product of an aminosilane, an epoxy silane and an acid anhydride disclosed in Japanese Patent Kokai 56-16573, (8) a modified thermoplastic acrylic polymer which is a reaction product of an acrylic monomer, an epoxy methacrylate and a hydroxybenzophenone-based ultraviolet absorber disclosed in Japanese Patent Kokai 57-23661, (9) an organopolysiloxane containing an alkoxysilyl-functional aromatic ultraviolet absorber and colloidal silica and so on.

Each of these prior art priming or undercoating compositions, however, is not quite satisfactory in one or more respects. For example, the priming treatment by using the above described first or second primer composition is considerably effective in improving the adhesion of the protective coating layer to the substrate surface but substantially no improvement can be obtained thereby in the weatherability of the coating layer rather with a decrease in the resistance against water as a consequence of the chemical structure having active hydrogen atom-containing groups such as amino groups and the like. The third and fourth primer compositions, though effective in improving the adhesion of the coating layer to the substrate surface, have problems of insufficient resistance of bonding against water and decrease in the weatherability due to the presence of active hydrogen atoms in addition to the defect of possible yellowing. Moreover, the primer compositions of this type are subject to an increase in the consistency during storage as a result of the reaction between the hydroxy groups and carboxyl groups and the alkoxy groups in the components so as to decrease the workability in coating and decrease in the priming effect due to the increase in the degree of polymerization. The primer composition of the fifth type is imparted with weatherability improved to a considerable extent in so far as the desired weatherability is for a short time but the weatharability is still insufficient for a long period of time. When the coating thickness thereof is increased with an object to improve the weatherability, a drawback is caused that the hardness of the anti-wearing protecting overcoating layer of the organopolysiloxane composition may eventually be decreased to be less wear-resistant. When the amount of the ultraviolet absorber is increased with the same object, the coating layer may be subject to whitening along with a decrease in the priming effect. The primer composition of the sixth type, which is in the form of an aqueous emulsion, is under a limitation in the types of the ultraviolet absorbers contained therein in respect of the solubility in water so that the weatherability, in particular, under ultraviolet light of the coating layer is improved sometimes only insufficiently. Moreover, it is a defect inherent in thermosetting resins such as acrylic resins that the priming effect for adhesion improvement cannot be high enough. The compositions of the seventh type have similar disadvantages to those in the compositions of the third and fourth types. The compositions of the eighth type cannot contain a sufficiently large amount of ultraviolet absorbers since most of the ultraviolet-absorbing compounds act also as a free radical scavenger to retard the polymerization reaction so that sufficiently high weatherability and priming effect can hardly be obtained. The undercoating compositions of the ninth type is inferior in the adhesiveness through with an improvement in the weatherability.

SUMMARY OF THE INVENTION

The present invention accordingly has an object to provide a novel and improved primer composition capable of exhibiting a high priming effect when a silicone-based protective coating layer is formed on the surface of a plastic-made substrate or, in particular, polycarbonate-made substrate without the above described problems and disadvantages in the prior art primer compositions.

The primer composition of the present invention comprises, in admixture as dissolved in an organic solvent:

(a) 100 parts by weight of a copolymer of a monomer mixture composed of (a-1) from 2 to 50% or, preferably, from 5 to 45% by weight of an ethylenically unsaturated monomeric compound having, in a molecule, an alkoxysilyl group and (a-2) from 98 to 50% or, preferably, from 95 to 55% by weight of an ethylenically unsaturated monomeric compound free from alkoxysilyl groups and copolymerizable with the monomeric compound (a-1); and (b) from 5 to 300 parts by weight or, preferably, from 10 to 200 parts by weight of an amidated product obtained by the reaction of an amidating agent selected from the group consisting of halides, anhydrides and isopropenyl esters of carboxylic acids and a product obtained by the reaction of an amino group-containing alkoxysilane compound, an epoxy group-containing alkoxysilane compound and a silylating agent.

In particular, the ethylenically unsaturated group in the monomeric compound (a-1) is a vinyl group or an acryloxy-alkyl or methacryloxyalkyl group bonded to the silicon atom of the alkoxysilyl group.

It is optional that the above defined primer composition of the present invention further comprises (c) a polymer of an (meth) acrylic monomer in an amount not exceeding 300 parts by weight per 100 parts by weight of the component (a).

The method of the present invention for providing a protecting coating layer on the surface of an article made of a platic resin such as a polycarbonate resin comprises the successive steps of:

(A) coating the surface of the plastic-made article with the above defined primer composition in the form of a solution in an organic solvent;

(B) evaporating the organic solvent in the coating layer on the surface of the plastic-made article and bringing the primer composition in the coating layer into a cured coating film;

(C) coating the surface of the cured coating film of the primer composition with a coating composition comprising a hydrolysis product of an alkoxy silane compound represented by the general formula $R^2_m Si(OR)_{4-m}$, in which $R^2$ is a monovalent hydrocarbon group having 1 to 6 carbon atoms, R is a monovalent hydrocarbon group or alkoxyalkyl group having 1 to 6 carbon atoms and the subscript m is zero, 1 or 2, and a colloidal silica uniformly dispersed therein; and (D) heating the thus coated article at a temperature in the range from 50° to 140° C. to cure the coating composition.

DETAILED DESCRIPTION OF THE PREFERRED EMBODIMENTS

As is described above, the essential ingredients of the inventive primer composition are the above defined components (a) and (b) dissolved in an organic solvent. The component (a) is a copolymer of which one of the comonomers, i.e. the monomeric compound (a-1), is an ethylenically unsaturated monomeric compound having, in a molecule, an alkoxysilyl group. This monomeric compound is polymerizable by the mechanism of radical polymerization at the ethylenically unsaturated group which is preferably a vinyl or (meth)acryloxyalkyl group bonded to the silicon atom of the alkoxysilyl group.

The (meth)acrylic-polymerizable monomer as the monomeric compound (a-1) is a silane represented by the general formula

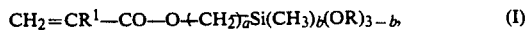

$$CH_2=CR^1—CO—O+CH_2)_a Si(CH_3)_b(OR)_{3-b}, \quad (I)$$

in which $R^1$ is a hydrogen atom or a methyl group, R is a monovalent hydrocarbon group having 1 to 6 carbon atoms selected from the class consisting of alkyl groups, e.g., methyl, ethyl, propyl and butyl groups, alkenyl groups, e.g., vinyl, allyl and isopropenyl groups, and aryl groups, e.g., phenyl group, the subscript a is 1, 2 or 3 and the subscript b is zero or 1.

Examples of the above defined (meth)acrylic-polymerizable monomer as the monomeric compound (a-1) include 3-methacryloxypropyl trimethoxy silane, 3-methacryloxypropyl triethoxy silane, 3-methacryloxypropyl tributoxy silane, 3-methacryloxypropyl triisopropenyloxy silane, methacryloxymethyl trimethoxy silane, methacryloxymethyl triethoxy silane, methacryloxymethyl tributoxy silane, 3-acryloxypropyl trimethoxy silane, 3-acryloxypropyl triethoxy silane, 3-acryloxpropyl tributoxy silane, acryloxymethyl trimethoxy silane, acryloxymethyl triethoxy silane, acryloxymethyl tributoxy silane, 3-methacryloxypropyl methyl dimethoxy silane, 3-methacryloxypropyl methyl diethoxy silane, 3-methacryloxypropyl methyl dibutoxy silane, methacryloxymethyl methyl dimethoxy silane, methacryloxymethyl methyl diethoxy silane, methacryloxymethyl methyl dibutoxy silane, 3-acryloxypropyl methyl dimethoxy silane, 3-acryloxypropyl methyl diethoxy silane, 3-acryloxypropyl methyl dibutoxy silane, acryloxymethyl methyl dimethoxy silane, acryloxymethyl methyl diethoxy silane, acryloxymethyl methyl dibutoxy silane and the like, of which particularly preferable are 3-methacryloxypropyl trimethoxy silane and 3-methacryloxylpropyl methyl dimethoxy silane in respect of the reactivity, availability, easiness in handling and adequate crosslinking density obtained therefrom.

The vinyl-polymerizable monomer as the monomeric compound (a-1) is a silane represented by the general formula

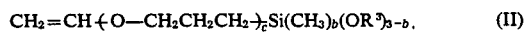

$$CH_2=CH+O—CH_2CH_2CH_2)_c Si(CH_3)_b(OR^3)_{3-b}, \quad (II)$$

in which $R^3$ is a monovalent hydrocarbon group or an alkoxy-substituted alkyl group having 1 to 6 carbon atoms, the subscript b is zero or 1 and the subscript c is zero or 1.

Examples of the above defined vinyl-polymerizable monomer as the monomeric compound (a-1) include vinyl trimethoxy silane, vinyl triethoxy silane, vinyl tributoxy silane, vinyl tris(2-methoxyethoxy) silane, vinyl methyl dimethoxy silane, vinyl methyl diethoxy silane, vinyl methyl dibutoxy silane, vinyl methyl bis(2-methoxyethoxy) silane, 3-vinyloxypropyl trimethoxy silane, 3-vinyloxypropyl triethoxy silane, 3-vinyloxypropyl methyl dimethoxy silane, 3-vinyloxypropyl methyl diethoxy silane, 3-vinyloxypropyl methyl dibutoxy silane and the like, of which particularly preferable are vinyl trimethoxy silane, vinyl triethoxy silane and 3-vinyloxypropyl trimethoxy silane in respect of the reactivity.

The monomeric compound (a-2) to be copolymerized with the above described monomeric compound (a-1) is exemplified by alkyl methacrylates, e.g., methyl methacrylate, butyl methacrylate and 2-ethylhexyl methacrylate, alkyl acrylates, e.g., methyl acrylate, ethyl acrylate and butyl acrylate, glycidyl methacrylate, acrylamide, acrylonitrile, vinyl acetate, vinyl ether compounds, e.g., ethyl vinyl ether, butyl vinyl ether and hexyl vinyl ether, styrene, ethylene glycol dimethacrylate and the like. Hydroxyalkyl-containing monomeric compounds such as 2-hydroxyethyl methacrylate and the like are not preferred because the primer composition comprising a copolymer prepared from such a monomer may be subject to a viscosity increase or eventual gelation during storage as a consequence of the reaction between the hydroxyalkyl groups and the alkoxysilyl groups.

The copolymer of the above described two types of the monomeric compounds (a-1) and (a-2) as the component (a) of the inventive primer composition should be prepared by polymerizing a monomer mixture of which the amount of the monomeric compound (a-1) is from 2 to 50% by weight or, preferably, from 5 to 45% by weight and the amount of the monomeric compound (a-2) should be the balance, i.e. 98 to 50% by weight or, preferably, 95 to 55% by weight. When the amount of the monomeric compound (a-1) is too small, the copolymer can no longer be thermosetting with only poor heat resistance and durability of the coating layer in addition to a decrease in the adhesion with the overcoating layer while an excessively large amount thereof may cause brittleness of the copolymer after curing to decrease the desired priming effect.

The copolymerization of the monomeric compounds (a-1) and (a-2) can be performed in a variety of known polymerization methods. Conveniently, the copolymerization reaction is performed by dissolving the monomeric compounds in an organic solvent together with a radical polymerization initiator such as organic peroxides, e.g., dicumyl peroxide and benzoyl peroxide, and azo compounds, e.g., azobisisobutyronitrile, and heating the solution at an appropriate temperature.

As is mentioned above, the inventive primer composition may optionally contain another polymeric ingredient as the component (c) in addition to the above described copolymer as the component (a). This optional polymeric ingredient is a polymer of a (meth)acrylic compound exemplified by the polymers of methyl methacrylate, butyl methacrylate, butyl acrylate and the like as well as copolymers of these monomers. This auxiliary polymer is added to the inventive primer composition when it is desired to increase the viscosity of the composition without affecting the priming effect to improve the adhesion of the overcoating layer to the substrate surface. Therefore, addition of this optional polymer is desirable when the primer composition has a viscosity so low that the coating film formed therefrom cannot have a sufficiently large thickness. When added, the amount of this component (c) in the inventive primer composition should not exceed 300 parts by weight per 100 parts by weight of the component (a). When the amount thereof is too large, certain adverse influences are caused on the thermal curability of the composition.

The component (b), which is another essential ingredient in the inventive primer composition, is prepared by the amidation reaction of a product obtained by the reaction of an amino-functional or amino group-containing alkoxy silane compound, an epoxy-functional or epoxy group-containing alkoxy silane compound and a silylating agent. This component is effective to increase the water resistance of the coating layer adhesively bonded to the substrate surface primed by using the inventive primer composition. In addition, this component has an effect to increase the stability of a photostabilizer optionally added to the primer composition to form crosslinks with the component (a) in the layer of the primer composition.

Examples of the amino-functional or amino group-containing alkoxy silane compound used as a starting material of the component (b) include N-(2-aminoethyl)-3-aminopropyl trimethoxy silane, N-(2-aminoethyl)-3aminopropyl triethoxy silane, N-(2-aminoethyl)-3-aminopropyl methyl dimethoxy silane, N-(2-aminoethyl)-3-aminopropyl methyl diethoxy silane, 3-aminopro-pyl methyl dimethoxy silane, 3-aminopropyl triethoxy silane, N-(4-aminobutyl)-3-aminopropyl trimethoxy silane, N-(4-aminobutyl)-3-aminopropyl methyl dimethoxy silane, N-(6-aminohexyl)-3-aminopropyl trimethoxy silane, N-(6-aminohexyl)-3-aminopropyl methyl dimethoxy silane, N-(2-aminoethyl)-aminomethylstyryl trimethoxy silane, N-(2-aminoethyl)-aminomethylstyryl methyl dimethoxy silane and the like, of which N-(2-aminoethyl)-3-aminopropyl trimethoxy silane and N-(2-aminoethyl)-3-aminopropyl methyl dimethoxy silane are preferred in respect of the high priming effect and easiness in handling.

Examples of the epoxy-functional or epoxy group-containing alkoxy silane compound to be reacted with the above named amino-functional alkoxy silane compound include 3-glycidyloxypropyl trimethoxy silane, 3-glycidyloxypropyl methyl dimethoxy silane, 3-glycidyloxy-propyl triethoxy silane, 3-glycidyloxypropyl methyl diethoxy silane, 2-(3,4-epoxycyclohexyl)ethyl triethoxy silane, 5,6-epoxyhexyl trimethoxy silane, 5,6-epoxyhexyl methyl dimethoxy silane, 7,8-epoxyoctyl trimethoxy silane, 9,10-epoxydecyl trimethoxy silane and the like, of which 3-glycidyloxypropyl trimethoxy silane, 3-glycidyloxypropyl methyl dimethoxy silane and 2-(3,4-epoxycyclohexyl)ethyl triethoxy silane are preferred in respect of the reactivity and easiness in handling.

The silylating agent here implied is an organosilicon compound capable of reacting with an active hydrogen atom as in —OH, —NH and —SH to replace the active hydrogen atom with an organosilyl group. Examples of the silylating agent include a combination of trimethyl chlorosilane and triethyl amine, hexamethyl disilazane, N,N-bis(trimethylsilyl) formamide, N,N-bis(trimethylsilyl) urea and the like. Such a silylating agent acts to protect the hydroxy groups formed by the reaction of the amino-functional and epoxy-functional alkoxy silanes and prevent the reaction of the hydroxy groups with the alkoxysilyl groups consequently to increase the stability of the reaction product in the lapse of time.

The reaction of the amino-functional and epoxy-functional alkoxy silanes in the presence of the silylating agent is performed usually by adding the epoxy-functional alkoxy silane compound dropwise to a mixture of the amino-functional alkoxy silane compound and the silylating agent and heating the reaction mixture. Alternatively, the amino-functional and epoxy-functional alkoxy silanes are first reacted and the reaction product is then admixd with the silylating agent. The mixing ratio of the amino-functional alkoxy silane compound to the epoxy-functional alkoxy silane compound in the reaction mixture should be such that the molar ratio of the epoxy groups to the amino groups is in the range from 0.3 to 1.2. When this molar ratio is too small, the number of the alkoxy groups pertaining to the crosslinking reaction is unduly small to decrease the curability of the composition along with the decrease in the adhesive bonding strength due to the deficiency in the three-dimensional spreading of the molecules as a whole. When this molar ratio is too large, on the other hand, the amino groups in the amino-functional alkoxy silane compound are exhaustively reacted with the epoxy groups in the epoxy-functional alkoxy silane compound to leave little number of imino groups susceptible to the amidation reaction described below so that the adhesive bonding of the coating layer on the surface primed with the primer composition would be less water-resistant.

The component (b) in the inventive primer composition is obtained by amidating the above described reaction product of the amino- and epoxy-functional alkoxy silane compounds in the presence of the silylating agent. The amidating agent suitable for the reaction is a halide, anhydride or isopropenyl ester of a carboxylic acid exemplified by acetyl chloride, acetyl bromide, propionyl chloride, butyryl chloride, acetic anhydride, isopropenyl acetate, benzoyl chloride and the like.

The amount of the component (b) compounded with the component (a) in the inventive primer composition is usually in the range from 5 to 300 parts by weight or, preferably, from 10 to 200 parts by weight per 100 parts by weight of the component (a). When the amount of the component (b) is too small, the priming effect obtained with the primer composition is insufficient so that the adhesion of the overcoating layer to the substrate surface would be poor. When the amount of the component (b) is too large, on the other hand, the coating film of the primer composition after curing may have an excessively high hardness which also causes poor adhesion of the overcoating layer to the substrate.

The primer composition of the invention is prepared by uniformly blending the above described components (a), (b) and, optionally, (c) each in an appropriately calculated amount. It is of course optional that the composition is further admixed with various kinds of known additives conventionally used in silicone-based primer compositions including ultraviolet absorbers which may be a salicylic acid-based, benzophenone-based, benzotriazole-based or cyanoacrylate-based compound having a protecting effect for the layer of the primer composition per se and the plastic-made substrate, antioxidants which may be a phenolic or phosphate compound.

The primer composition of the invention formulated with the above described ingredients is used usually in the form of a solution in an organic solvent. Examples of suitable organic solvents include alcohols, e.g., methyl alcohol, ethyl alcohol, isobutyl alcohol, 2-ethoxyethyl alcohol and diacetone alcohol, ketones, e.g., methyl ethyl ketone and methyl isobutyl ketone, esters, e.g., ethyl acetate and isobutyl acetate, and aromatic hydrocarbon compounds, e.g., toluene, as well as mixtures thereof. The concentration of the primer composition in the solution is preferably such that the solution may have a viscosity in the range from 5 to 30 centistokes at 25° C. When the viscosity of the solution is too low, a sufficiently high coating amount of the primer composition can hardly be obtained by a single coating procedure. When the viscosity of the solution is too high, on the other hand, certain inconvenience is caused in handling of the solution along with a limitation in the applicable coating methods. The thickness of the coating film of the inventive primer composition on the surface of a substrate of, for example, a plastic material should be in the range from 1 to 10 μm or, preferably, from 2 to 5 μm after evaporation of the solvent by heating or by standing at room temperature. The solution of the primer composition can be admixed according to need with a surface active agent which may be a silicone-based or fluorocarbon-based one with an object to increase the smoothness of the coating film of the composition and a curing catalyst having an alkoxysilyl group with an object to accelerate curing of the coating film of the composition.

Shaped articles of a plastic resin such as a polycarbonate can be imparted with greatly improved initial adhesion, resistance against heat and hot water and weatherability by being provided with a coating film of the inventive primer composition. In particular, a highly durable wearing-resistant protecting layer with good adhesion can be obtained when a plastic-made shaped article is first coated with the inventive primer composition and then overcoated with a curable organopolysiloxane composition containing a colloidal silica powder dispersed therein. Such an overcoating composition is prepared, for example, by admixing a (co)hydrolysis product of one or more of alkoxy silane compounds represented by the general formula

in which $R^2$ is a monovalent hydrocarbon group having 1 to 6 carbon atoms or an alkoxyalkyl group, R has the same meaning as defined before and the subscript m is zero, 1 or 2, exemplified by methyl trimethoxy silane, methyl triethoxy silane, methyl tributoxy silane, methyl tris(2-methoxyethoxy) silane, ethyl trimethoxy silane, ethyl triethoxy silane, phenyl trimethoxy silane, phenyl triethoxy silane, dimethyl dimethoxy silane, dimethyl diethoxy silane, diphenyl dimethoxy silane, diphenyl diethoxy silane, tetramethoxy silane, tetra-ethoxy silane, tetrabutoxy silane, tetrakis (2-methoxyethoxy) silane and the like, with 5 to 70% by weight of a colloidal silica powder having a particle diameter of 1 to 100 nm as dispersed in an alcoholic solvent, e.g., methyl alcohol, ethyl alcohol, isobutyl alcohol and diacetone alcohol. This over-coating composition can be cured by evaporating the solvent and heating the coated article at 50° to 140° C. to form a coating layer firmly adhering to the substrate surface primed with the inventive primer composition in advance to exhibit a synergistic effect.

In the following, the primer composition of the invention is described in more detail by way of examples as preceded by the description of the preparation procedures of the components (a) and (b), in which the terms of "parts" and "%" always refer to "parts by weight" and "% by weight", respectively. In the following examples, the protecting overcoating formed on the surface of a substrate primed with the inventive primer composition was evaluated according to the following procedures for the respective items.

Wearing Resistance

The coated surface was subjected to abrasion by using a Taber abrasion testing machine under a load of 500 g for 100 revolutions and the cloudiness of the surface was measured by using a haze meter.

Hardness

Hardness of the coated surface was evaluated by the pencil hardness.

Adhesion of the Coating Layer

A 10×10 checkerboad squares of each 1 mm by 1 mm were formed by making lines of incision in the overcoating layer and a pressure-sensitive adhesive tape was applied and bonded thereto and forcibly peeled off therefrom to count the number of the checkerboard squares unlifted by the tape. The results were given by the number per 100 squares.

Heat Resistance

The overcoated shaped article was kept at 100° C. for 100 hours and the appearance, hardness and adhesion of the coating layer were evaluated. The results were rated in A, B and C, the rating of A being for the coating layer retaining the as-formed properties after the thermal aging treatment. The rating B was given to the coating layer which exhibited a noticeable change in either one of the three items of appearance, hardness and adhesion and the rating C was given to the coating layer which exhibited noticeable changes in all of the above mentioned three items.

Resistance Against Hot Water

The overcoated shaped article was kept in water at 75° C. for 100 hours and the appearance, hardness and adhesion of the coating layer were evaluated. The results were rated in A, B, C and D, the criteria for the ratings of A, B and C being the same as in the above described heat resistance test and the rating D being for the condition in which falling of the coating layer took place.

Weatherability

The overcoated shaped article was subjected to accelerated weathering in Sunshine Weather-O-Meter or in UVCON (a product by Atlas Co., U.S.A.) and the length of time in hours was recorded until falling of the coating layer or decrease of the pencil hardness thereof took place.

Synthetic Preparation of the Component (a)

Six copolymers A-I to A-VI were prepared each by introducing 3-methacryloxypropyl trimethoxy silane (KBM 503, a product by Shin-Etsu Chemical Co., Japan) or vinyl trimethoxy silane (KBM 1003, a product by Shin-Etsu Chemical Co., Japan) in an amount indicated in Table 1, methyl methacrylate (referred to as MMA hereinbelow) in an amount indicated in the same table, 5 parts of ethyl acrylate, 5 parts of vinyl acetate, 10 parts (when the copolymers was A-I, A-II, A-III, A-IV or A-VI) or 30 parts (when the copolymer was A-V) of glycidyl methacrylate, 0.2 part of ethylene glycol dimethacrylate (omitted when the copolymer was A-II), 0.5 part of azobisisobutyronitrile and 100 parts of diacetone alcohol to form a polymerization mixture and heating the mixture under a stream of nitrogen gas at 80° to 90° C. for 5 hours with agitation. The weight fractions of the KBM 503 or KBM 1003, i.e. the alkoxysilyl-containing monomer, in the comonomer mixtures were 20%, 20%, 40%, 20%, 0% and 60% for the copolymers A-I, A-II, A-III, A-IV, A-V and A-VI, respectively. The thus obtained copolymers after evaporation of the solvent had a viscosity shown in Table 1 at 25° C.

TABLE 1

| Copolymer No. | A-I | A-II | A-III | A-IV | A-V | A-VI |
|---|---|---|---|---|---|---|
| KBM 503, parts | 20 | 20 | 40 | — | — | 60 |
| KBM 1003, parts | — | — | — | 20 | — | — |
| MMA, parts | 60 | 60 | 40 | 70 | 60 | 20 |
| Viscosity of copolymer, poise | 436 | 123 | 385 | 407 | 512 | 355 |

Synthetic Preparation of the Component (b)

An additive compound used as the component (b), referred to as the additive B-I hereinbelow, was prepared in the following manner. Thus, a reaction mixture composed of 222 g of N-(2-aminoethyl)-3-aminopropyl trimethoxy silane (KBM 603, a product by Shin-Etsu Chemical Co., Japan) and 242 g of hexamethyl disilazane in a flask equipped with a condenser was heated at 120° C. under a stream of nitrogen gas and 496 g of 3-glycidyloxypropyl methyl diethoxy silane (KBE 402, a product by Shin-Etsu Chemical Co., Japan) were added dropwise thereto followed by continued agitation for 5 hours at the same temperature to effect the reaction followed by stripping of low boiling-point matters under a reduced pressure at 100° C. to give 862 g of a viscous liquid product having a viscosity of 1387 centistokes at 25° C., refractive index of 1.4618 and specific gravity of 1.048. This product is referred to as the additive B hereinbelow.

The above obtained viscous liquid, i.e. the additive B, in the flask was diluted with 862 g of toluene under a stream of nitrogen gas and 141 g of acetic anhydride were added thereto dropwise at room temperature followed by heating at 110° C. for 2 hours with agitation to effect the amidation reaction. Thereafter, 141 g of methyl alcohol were added dropwise to the mixture kept at 50° C. and the mixture was agitated for 1 hour at the same temperature followed by stripping of the low boiling-point matters at 100° C. under a reduced pressure to give a highly viscous liquid product which is referred to as the additive B-I hereinbelow.

This reaction product had an infrared absorption spectrum in which no absorption bands were found in the wavelength region of 3000 cm$^{-1}$ or higher assignable to the hydroxyl groups —OH or imino groups >NH while a strong absorption band was found at 1650 cm$^{-1}$ assignable to amide linkages —NH—CO—. A 25% by weight solution of this product in ethylene glycol monoethyl ether had a viscosity of 6.4 centistokes at 25° C. and a specific gravity of 0.964. This solution was very stable relative to the viscosity which was increased very slightly to 6.5 centistokes at 25° C. after storage for 1 month at room temperature.

The above described procedure was repeated by replacing 141 g of the acetic anhydride with 138 g of isopropenyl acetate to give a similar product which is referred to as the additive B-V hereinbelow. Further, the same experimental procedure as above was repeated excepting replacement of the dropwise addition of 141 g of acetic anhydride with dropwise addition of first 152 g of triethyl amine as a hydrogen chloride acceptor and then 78.5 g of acetyl chloride to give also a similar product which is referred to as the additive B-VI hereinbelow.

For comparison, three more similar products, referred to as the additives B-II, B-III and B-IV hereinbelow, were prepared in the following manner. Thus, the additive B-II was prepared in substantially the same manner as in the preparation of the additive B-I excepting omission of the hexamethyl disilazane. The reaction product of KBM 603 and KBE 402 before the amidation reaction had an extremely high viscosity of 16,300 centistokes at 25° C. presumably due to the increased molecular weight to form a polymer by the intramolecular or intermolecular reaction of the amino groups and the hydroxy groups formed by the ring-opening reaction of the epoxy groups and other alkoxy groups. The 25% by weight solution of the amidation product in ethylene glycol monoethyl ether had a viscosity of 7.8 centistokes at 25° C. and a specific gravity of 0.965.

The additive B-III was prepared by the reaction of KBM 603, KBE 402 and acetic anyhydride each in the same amount as in the preparation of the additive B-I. This product had an infrared absorption spectrum in which absorption bands assignable to the imino groups >NH were found in the wavelength region of 3300 to 3400 cm$^{-1}$ presumably indicating a considerable amount of the amino groups directly converted into amide linkages as a consequence of the competition between the ring-opening reaction of the epoxy groups and the amidation reaction of the amino groups.

Further, the additive B-IV was prepared by the reaction of the KBM 603 and KBE 402 alone. A 25% by weight solution of this product had a viscosity of 6.0 centistokes at 25° C. and the viscosity was increased to 14.6 centistokes after storage at room temperature for 1 month. Preparation of the overcoating composition.

Into a flask of 1 liter capacity were introduced 164 g of methyl triethoxy silane (KBE 13, a product by Shin-Etsu Chemical Co.) and 46 g of isobutyl alcohol and the mixture was chilled at 5° C. or below. The mixture was admixed with 138 g of a colloidal silica dispersion containing 20% by weight of silica (Snowtex O, a product by Nissan Chemical Co.) kept at 5° C. or below and agitated for 2 hours at the same temperature followed by further continued agitation for additional 8 hours at a temperature of 20° to 25° C. Further, the mixture was admixed with 36 g of ethylene glycol monoethyl ether and 1.8 g of a polyether-modified silicone (KP 341, a product by Shin-Etsu Chemical Co.) and then with 1.5 g of a 10% aqueous solution of potassium propionate followed by adjustment of the pH to 6 to 7. The thus prepared colloidal silica-containing organopolysiloxane composition for overcoating is referred to as the coating composition C-I hereinbelow.

Another overcoating composition, referred to as the coating composition C-II hereinbelow, was prepared in the same manner as above excepting replacement of 1.5 g of the 10% aqueous solution of potassium propionate with 3.0 g of a 10% aqueous solution of tetramethyl ammonium benzoate.

EXAMPLE

Fifteen primer compositions, referred to as the primers P-I to P-XV hereinbelow and shown in Table 2, of which the primers P-X to P-XV were for comparative purpose, were prepared each by uniformly blending 12 g of one of the copolymers A-I to A-VI, 5.0 g of one of the additives B or B-I to B-IV excepting for the primer P-VI, in which the amount was 1.0 g instead of 5.0 g, a varied amount of a photostabilizer which was 2-(2'-hydroxy-3', 5'-di-tert-butylphenyl)-5-chlorobenzotriazole (Tinuvin 327, a product by Ciba Geigy Co.) excepting for the primer P-VII or 2,4-dihydroxy benzophenone for the primer P-VII, 22.5 g of methyl isobutyl ketone, 20.0 g of isobutyl acetate, 16.0 g of ethylene glycol monoethyl ether, 22.0 g of isopropyl alcohol and 4.0 g of diacetone alcohol. These primers P-I to P-XV each had a viscosity at 25° C. shown in Table 2. The primer V was further compounded with 2.0 g of a poly(methyl methacrylate) having an average molecular weight of about 150,000.

A plate of a polycarbonate resin after cleaning of the surface was dipped in one of the thus prepared primer compositions and pulled up therefrom followed by air-drying and then a heat treatment at 80° C. for 10 minutes to give a surface-primed polycarbonate resin plate of which the cured coating film of the primer composition had a thickness of 3 μm.

The thus prepared surface-primed resin plates were each coated with the coating composition C-I by dipping therein and then pulling up therefrom followed by air-drying and a heat treatment at 120° C. for 2 hours to form a cured overcoating layer having a thickness of 3 μm. These surface-coated resin plates were subjected to the evaluation of the protecting coating by the procedures described before to give the results shown in Table 3. The results of the checkerboard adhesion test were that no falling of the checkerboard squares was noted on each of the samples excepting for the primers P-IX and P-X of which the results were 95/100 and 70/100, respectively. Substantially identical results were obtained by replacing the coating composition C-I with the coating composition C-II.

Further primer compositions were prepared by using the additive B-V or B-VI in place of the additive B-I in the primer compositions P-I to P-XI. The results of the tests obtained with these primer compositions were substantially identical with those obtained in the tests of the primer compositions prepared by using the additive B-I in otherwise the same formulation.

TABLE 2

| Primer | Copolymer | Additive | Photostabilizer, grams | Viscosity, centistokes |
|---|---|---|---|---|
| P-I | A-I | B-I | 2.5 | 7.6 |
| P-II | A-II | B-I | 2.5 | 4.9 |
| P-III | A-III | B-I | 2.5 | 7.2 |
| P-IV | A-IV | B-I | 2.5 | 7.3 |
| P-V | A-II | B-I | 2.5 | 8.8 |
| P-VI | A-I | B-I | 2.5 | 7.3 |
| P-VII | A-I | B-I | 2.5 | 7.6 |
| P-VIII | A-I | B-I | 1.0 | 7.4 |
| P-IX | A-I | B-I | 4.0 | 8.2 |
| P-X | A-V | B-I | 2.5 | 7.9 |
| P-XI | A-VI | B-I | 2.5 | 6.9 |
| P-XII | A-I | B-II | 2.5 | 8.0 |
| P-XIII | A-I | B-III | 2.5 | 7.7 |
| P-XIV | A-I | B-IV | 2.5 | 7.8 |
| P-XV | A-I | B | 2.5 | 7.8 |

TABLE 3

| Primer | Pencil hardness | Heat resistance | Hot water resistance | Weatherability, hours | |
|---|---|---|---|---|---|
| | | | | Weather-O-Meter | UVCON |
| P-I | 7H | A | A | 2500 | 1000 |
| P-II | 7H | A | A | 2200 | 800 |
| P-III | 7H | A | A | 2300 | 800 |
| P-IV | 7H | A | A | 2300 | 800 |
| P-V | 6H | A | A | 2500 | 700 |
| P-VI | 7H | A | A | 2000 | 700 |
| P-VII | 7H | A | A | 2300 | 800 |
| P-VIII | 7H | A | A | 900 | 400 |
| P-IX | 5H | C | D | 2500 | 1000 |
| P-X | 5H | C | C | 1000 | 500 |
| P-XI | 7H | B | B | 1800 | 600 |
| P-XII | 7H | A | D | 2200 | 700 |
| P-XIII | 7H | A | D | 1700 | 600 |

TABLE 3-continued

| Primer | Pencil hardness | Heat resistance | Hot water resistance | Weatherability, hours | |
|---|---|---|---|---|---|
| | | | | Weather-O-Meter | UVCON |
| P-XIV | 7H | A | D | 1400 | 600 |
| P-XV | 7H | B | D | 1200 | 600 |

What is claimed is:

1. A method for providing a protective coating layer on the surface of an article made of a plastic resin which comprises the successive steps of:

(A) coating the surface of the plastic-made article with a primer composition in the form of a solution in an organic solvent;

(B) evaporating the organic solvent in the coating layer on the surface of the plastic-made article bringing the primer composition in the coating layer into a cured coating film;

(C) coating the surface of the cured coating film of the primer composition with a coating composition comprising a hydrolysis product of an alkoxy silane compound represented by the general formula $R^2{}_m Si(OR)_{4-m}$, in which $R^2$ is a monovalent hydrocarbon group having 1 to 6 carbon atoms, R is a monovalent hydrocarbon group or alkoxyalkyl group having 1 to 6 carbon atoms and the subscript m is zero, 1 or 2, and a colloidal silica uniformly dispersed therein; and (D) heating the thus coated article at a temperature in the range from 50° to 140° C. to cure the coating composition, said primer composition comprising:

(a) 100 parts by weight of a copolymer of a monomer mixture composed of (a-1) from 2 to 50% by weight of an ethylenically unsaturated monomeric compound having, in a molecule, an alkoxysilyl group and (a-2) from 98 to 50% by weight of an ethylenically unsaturated monomeric compound free from alkoxysilyl groups and copolymerizable with the monomeric compound (a-1); and (b) from 5 to 300 parts by weight of an amidated product obtained by the reaction of an amidating agent selected from the group consisting of acetyl chloride, acetyl bromide, propionyl chloride, butyryl chloride, acetic anhydride, isopropenyl acetate, benzoyl chloride and mixtures thereof and a product obtained by the reaction of an amino group-containing alkoxysilane compound, an epoxy group-containing alkoxysilane compound and a silylating agent.

2. The method as claimed in claim 1 wherein the amidating agent in the primer composition is an anhydride of a carboxylic acid.

3. The method as claimed in claim 1 wherein the ethylenically unsaturated monomeric compound (a-1) in the primer composition has a vinyl group or an acryloxy- or methacryloxy-substituted alkyl group bonded to the silicon atom of the alkoxysilyl group.

4. The method as claimed in claim 1 wherein the primer composition further comprises (c) a polymer of an acrylic or methacrylic monomer.

* * * * *